No. 871,460. PATENTED NOV. 19, 1907.
E. D. VALENTINE.
RIM FOR VEHICLE WHEELS.
APPLICATION FILED AUG. 17, 1906.
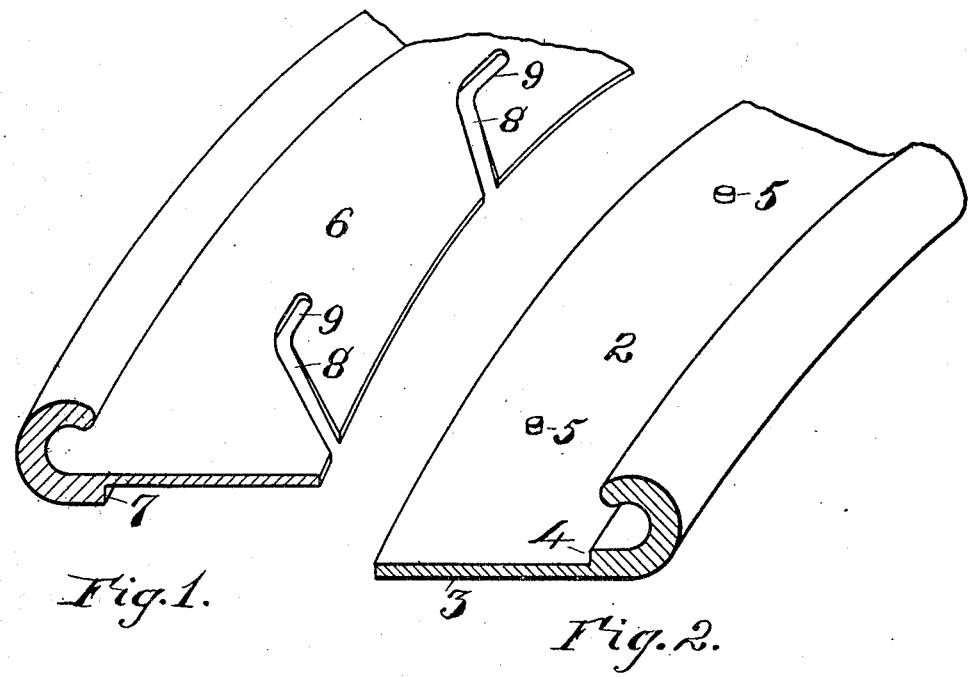
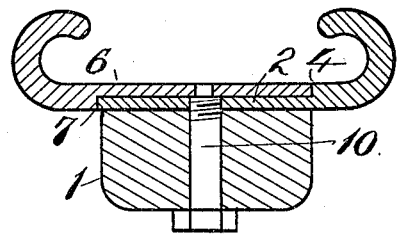

UNITED STATES PATENT OFFICE.

ERNEST D. VALENTINE, OF AKRON, OHIO.

RIM FOR VEHICLE-WHEELS.

No. 871,460.  Specification of Letters Patent.  Patented Nov. 19, 1907.

Application filed August 17, 1906. Serial No. 331,048.

*To all whom it may concern:*

Be it known that I, ERNEST D. VALENTINE, a citizen of the United States, residing at Akron, in the county of Summit and State of Ohio, have invented new and useful Improvements in Rims for Vehicle-Wheels, of which the following is a specification.

This invention relates to vehicle wheels provided with means for holding pneumatic, solid or cushion tires of elastic material, more particularly pneumatic tires of the double tube type, having contractible, inextensible or semi-inextensible bands or edges, and the object thereof is to so construct the wheel as to enable the tire to be readily removed or applied when necessary.

The invention further aims to provide a wheel of the class referred to, with a new and improved rim, hereinafter more specifically described, said rim being simple in construction, strong, durable, efficient in use, comparatively inexpensive to manufacture, readily applied to wheels, and so constructed as to render the tire readily removable therefrom when desired.

With the foregoing and other objects in view, the invention consists in the novel construction, combination and arrangement of parts constituting the invention to be hereinafter referred to and illustrated in the accompanying drawings which form a part of this specification in which is shown the preferred embodiment of the invention, but it is to be understood that changes, variations and modifications can be resorted to which come within the scope of the claims hereunto appended.

In the drawings, in which similar reference numerals indicate like parts in the different figures: Figure 1 is a perspective view of one part of my improved rim; Fig. 2 is a similar view of the other part of the same rim; and, Fig. 3 is a cross sectional view of a rim and tire portion of a wheel constructed in accordance with this invention.

Referring to the drawings, 1 denotes the felly of the wheel on which is mounted an annular member 2, provided with a flat under surface 3, which is mounted on the felly 1 and having its upper part formed in accordance with the well-known clencher type of rim. The upper surface of the annular member 2 is rabbeted, leaving a shoulder 4 from which the metal of the rim extends upwardly into the form already described.

The rabbeted portion of the annular member 2 is provided with a plurality of outwardly-extending fixed pins 5. Arranged to coöperate with the annular member 2 is a second member 6 having its outer surface formed in accordance with the well-known clencher type of rim, which is arranged to stand oppositely-disposed to the tire-engaging portion of the member 2. This member 6 has a rabbeted under surface terminating in a shoulder 7.

In assembling a rim of this type in position for use, the rabbeted portion of the member 6 is slipped sidewise over the rabbeted portion of the member 2 until it encounters the shoulder 4, and when this engagement has taken place, the shoulder 7 of the member 6 will engage the edge of the rabbeted portion of the member 2. In order to lock these two members into position when being assembled, the member 6 is provided with a plurality of slots 8, the number and position of which will correspond with the number and position of the pins 5 on the member 2. These slots 8 are preferably made as shown in Fig. 1, consisting of an inclined portion terminating in a circumferentially-arranged straight portion 9. These slots 8 and pins 5 are arranged to constitute a form of bayonet joint, so that when placing the member 6 on the member 2 the pins 5 will enter the slots 8, and during their passage through the inclined portion thereof they will gradually draw the member 6 inward until it engages the shoulder 4, after which it will be given a further partial turn in order to effectually lock the pins 5 into the circumferential portions 9 of the slots 8.

In order to securely retain the two members 2 and 6 in operative engagement with each other, I insert through the felly 1, a pin 10, which is of sufficient length to pass through suitable openings in both members 2 and 6 and prevent their unintentional movement with respect to each other.

It will be apparent that as long as the pin 10 is in the position shown in Fig. 3, the members are absolutely locked against removal; and when it is desired to remove a tire mounted upon this rim, the pin 10 is removed, and the member 6 given a partial revolution until the pins 5 pass from engagement with the slots 8. After this has been accomplished, the tire is readily removed sidewise from its seat on the member 2 without straining or stretching in any manner the side edges thereof and any repairs thereto may be made or a new tire substituted. In mounting a tire on this form of rim, the reverse of the previously-described operation is carried out.

It will be entirely obvious that the upper or tire-engaging portions of this rim may be altered so that any form or type of tire may be mounted thereon; and while I have shown a clencher type of rim for the purpose of illustration, I do not confine myself to this means for retaining a tire on this rim.

What I claim and desire to secure by Letters Patent, is:—

A separable rim for vehicle tires comprising as one of its elements an annular band of suitable width, provided along one side with tire-engaging means and further provided with a relatively wide shallow rabbet in its outer surface, a plurality of pins positioned within said rabbet and extending outwardly therefrom a distance not exceeding the depth of said rabbet, a second element arranged to coöperate with said first element to constitute in connection therewith a tire-retaining rim consisting of an annular band having a tire-engaging means along one side with a rabbet cut in its under face corresponding in contour and size to the rabbet in said first element and adapted to fit therein, said second element being further provided with a plurality of slots formed in the rabbeted portion thereof, said slots being partially obliquely and partially circumferentially formed and so positioned as to receive the pins on said first element and form a detachable interlocking engagement therewith, and a threaded pin arranged to engage in a threaded opening in said first element, said pin being provided with a projecting end arranged to enter an opening appropriately positioned in said second element whereby said elements are secured against unintentional dislodgment.

In testimony whereof I have hereunto set my hand in presence of two subscribing witnesses.

ERNEST D. VALENTINE.

Witnesses:
 Gus C. Mass,
 C. E. Humphrey.